Sept. 29, 1925.
F. W. HUBER
ELECTRODE MEANS FOR CONDUCTIVITY TESTS OF LIQUIDS
IN OIL WELLS OR OTHER BODIES OF LIQUID
Filed Dec. 15, 1924
1,555,803
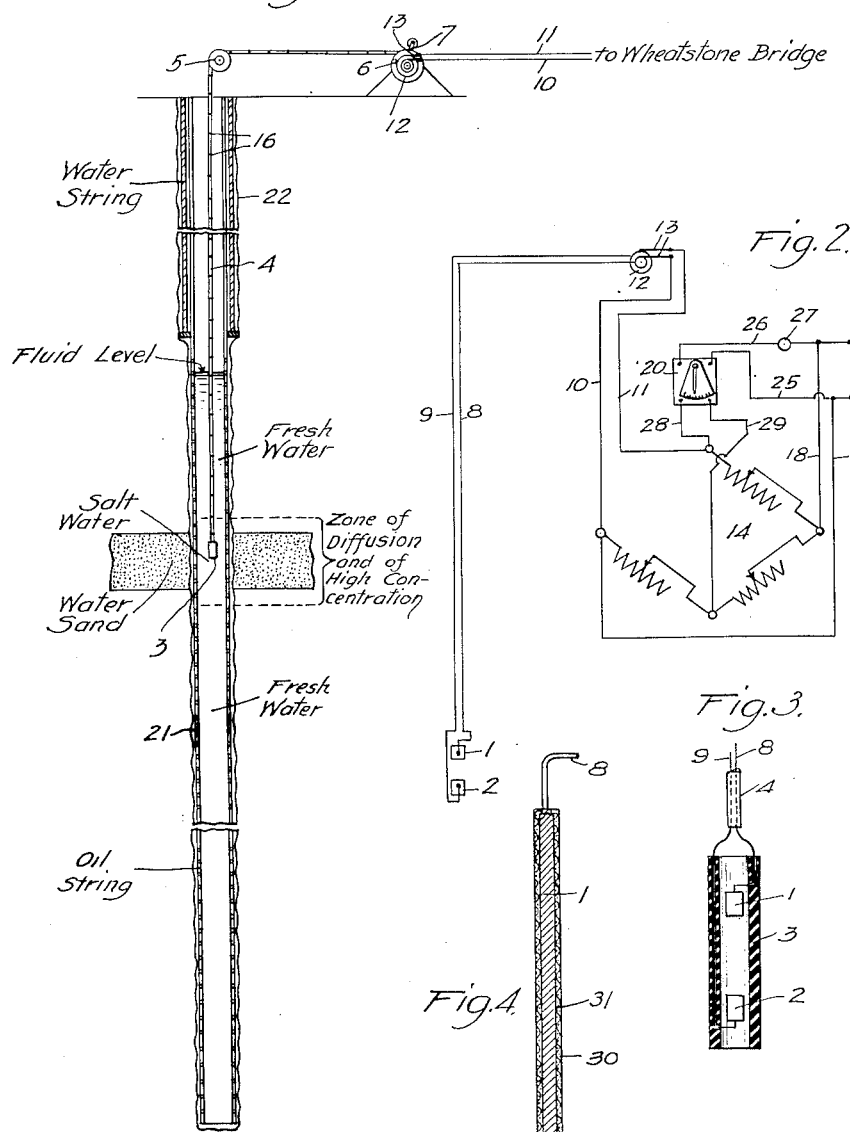
INVENTOR.
Frederick W. Huber,
BY Arthur P. Knight
ATTORNEY.

Patented Sept. 29, 1925.

1,555,803

UNITED STATES PATENT OFFICE.

FREDERICK W. HUBER, OF RIVERSIDE, CALIFORNIA.

ELECTRODE MEANS FOR CONDUCTIVITY TESTS OF LIQUIDS IN OIL WELLS OR OTHER BODIES OF LIQUID.

Application filed December 15, 1924. Serial No. 756,156.

*To all whom it may concern:*

Be it known that I, FREDERICK W. HUBER, a citizen of the United States, residing at Riverside, county of Riverside, State of California, have invented a new and useful Improvement in Electrode Means for Conductivity Tests of Liquids in Oil Wells or Other Bodies of Liquid, of which the following is a specification.

This invention relates to electrode means for determining the conductivity of liquids in wells or other bodies of liquid for the purpose, for example, of determining saline concentration in such liquid. My invention is particularly intended for use in carrying out the method included in my application, Serial No. 702,946, filed March 29, 1924, for method for locating water bearing strata in bore holes, of which this application is in part a continuation. The main object of the present invention is to provide electrode means which will operate effectively in liquids which are of such nature that the electrode means are liable to be subjected to contact with oil or oily material as well as to contact with water.

It has been found in applying electrode means of usual type having plain exposed metallic surfaces or other exposed conducting electrodes, in the determination of electrical conductivity of aqueous liquids containing or mixed with more or less oily material, that the contact of such oily material with the electrode surfaces seriously vitiates the results and in general prevents successful determination of the electrical conductivity by means of such electrodes. I have found however that by providing the electrodes with a suitable coating which is oil repellent (but not water repellent), such electrodes may be used effectively to give a correct determination of the electrical conductivity of the aqueous constituent of such liquids.

My invention is based upon this discovery and comprises electrode means as hereinafter set forth provided with suitable water attractive and oil repellent surface coatings which tend to maintain the effective contact of the electrodes with the electrolytic body in which they are immersed.

The accompanying drawings illustrate the invention and referring thereto:

Fig. 1 is a vertical section of a well showing my improved electrode means therein and the necessary electrical connections therefor.

Fig. 2 is a diagram of the electrical connections.

Fig. 3 is a vertical section of the electrode appliance for insertion in the body of liquid whose conductivity is to be measured.

Fig. 4 is a vertical section of one of the electrodes showing the coating of oil repellent material thereon.

I have illustrated the application of my improved electrode means in measuring the electrical conductivity and thus determining the saline concentration of the water in an oil well, for example, for the purpose of locating water bearing strata in such well by the method described in my patent application, Serial No. 702,946, above referred to. For this purpose the apparatus required comprises, in connection with the electrode means adapted to be exposed in contact with the liquid in the bore hole of the well, means for positioning said electrode means at different heights in the bore hole, circuit means, including a source of current for applying a definite electrical potential difference to said electrodes and electrical measuring means for determining the resistance and hence the concentration of the liquid present between the said electrodes.

The electrodes indicated at 1 and 2 may be mounted in any suitable manner for example within a cylinder 3 which is of insulating material, the electrodes in any case being insulated from one another and being mounted at a definite distance apart and the said cylinder being open, and preferably open at both ends, so as to allow free access of liquid to said electrodes. The electrodes 1 and 2 and their supporting and enclosing means 3 are mounted on any suitable flexible suspension means such as a cable 4 which passes over suitable sheave 5 at the top of the bore hole and is connected to suitable means such as a reel 6 having suitable means such as handle 7 for operating the same to wind the cable on the reel or to unwind it therefrom to cause ascent or descent of the electrode means in the bore hole. Said cable may be provided with markers 16 whereby it is marked off into convenient lengths for measuring the depth at which the electrode means is located at any particular instant of time or any other suitable means may be provided for indicating such depth. Electric circuit wires indicated at 8 and 9 are connected to the respective electrodes 1 and 2 and may form a part of the cable (said cable for example comprising two heavily insulated wires or conductors which are encased in a heavily insulated sheath) or may be connected thereto, said cable and wires being of sufficient length to permit the electrode means to be lowered to any part of a bore hole and to maintain electric connection with the electrodes in all operative positions thereof. Said wires 8 and 9 are connected at their upper ends to wires 10 and 11 forming a part of the electrical measuring circuit as hereinafter described, the connection for the respective wires 8 and 9, and 10 and 11 being, for example, by means of collector rings 12 and brushes 13, so as to admit operation of the reel 6 in raising or lowering the electrode means while maintaining such electric connection. Any suitable circuit means may be provided for applying the electric circuit or potential to the wires leading to the electrodes so as to measure the resistance of the medium presented between the electrodes, for example as shown in Fig. 3, said electric measuring means may comprise a Wheatstone bridge 14 of usual construction, which is connected to a source of current or electric potential and to the circuit wires 10 and 11. It is important that alternating current should be used in measuring the electrical resistance so as to avoid errors which would result from polarization in case direct current were used, and it is also important that no ground connections should be present, and in order to satisfy these requirements I prefer to use as a source of current a transformer whose primary winding 15 is connected to any suitable alternating current supply circuit, either single phase or poly-phase and whose secondary winding 17 is connected by wires 18 and 19 to opposite terminals of the Wheatstone bridge 14. The intermediate terminals of the Wheatstone bridge are connected in the usual manner to a null point indicator 20 which is of a type adapted for operation by alternating current. The transformer used may be of the iron core type, transforming for example from 110 to 6 volts, the latter voltage being applied to the wires 18 and 19 leading to the end terminals of the Wheatstone bridge, and the current connections leading to the electrode means, being indicated in one arm of the Wheatstone bridge in the usual manner of such electrical measuring devices.

In order that the electrode means shall operate effectively under the conditions above mentioned it is necessary that the surface of the electrodes which are in contact with the liquid not be wetted by oil but only by water and saline solutions. For this purpose I have found it to be of great advantage to coat the surface of the metal body or conductors forming the electrodes with a protective or selective coating or covering 30 of gelatinous substance having a tendency to be wetted by water, while repelling oily substances so as not to become wetted thereby. I have found that either gelatinous silica or agar may be used advantageously for this purpose. The gelatinous silica is however only applicable to platinum or gold electrodes or to their acid resisting alloys. To coat such an electrode I allow water glass of about 1.15 sp. gr. to harden in a thin film upon the electrode and then immerse it in a very dilute solution of mineral acid, which in the course of a few hours will form a gelatinous coating of silicic acid. This is then washed free of electrolytes and kept in a water saturated atmosphere until ready for use.

With the baser metals such as nickel (which I prefer to use in actual field work) I simply coat the cleaned electrode surface with a thin film of agar dissolved (dispersed) in hot distilled water, by dipping the electrode in the agar infusion and allowing to set, repeating the dipping and setting until a uniform and thin film is obtained over the entire electrode surface. The electrode after the agar has set is kept in water until ready for use. It is also of advantage to first cover the cleaned electrode with a fine cambric cloth as indicated at 31, and then saturate this cloth with hot agar infusion and build up on this covering a fine glaze of set agar. It is also of advantage, for particularly severe usage, to harden the agar by a hardening agent such as formaldehyde or alum, but this is generally not necessary.

A cambric covered agar coated set of electrodes I have found to be in excellent mechanical and electrical condition after making six round trips to the bottom of a 5000 foot bore hole.

The electrodes so coated with the oil repelling film, give in the laboratory when tested against uncoated electrodes practically the same readings instantly. That is it takes but an instant for the electrolyte or rather the ions to penetrate the film.

In rapidly raising and lowering the electrodes in their carrier, through the liquids in the well, the agar coating on the electrodes may easily become injured. When this happens, it is advisable to renew the same. For this, the old agar can be simply scraped off, or the entire electrode can be placed in water and boiled, or can be blown in a steam box. The electrode (with its entire cover) can then (after cooling and after scrubbing if necessary) be dipped into a hot infusion of agar of say, 2 to 5% strength. This is then cooled and dipping can be repeated until a layer of the agar jelly of say 1/32 to 1/64 inch is formed.

I will describe the operation the apparatus above described as utilized in determining the conductivity of an aqueous liquid contained in an oil well bore as shown in Fig. 1. By determining the conductivity of the liquid at any point in such a well it is possible to ascertain the saline concentration at such point and thereby obtain information as to location of saline water bearing strata adjacent the oil well, as set forth in my application above referred to. In Fig. 1 the bore hole is shown as provided with the usual casing or oil string 21 having perforations for entrance of liquid therein from the surrounding strata, and the usual water string 22 cemented off at its lower end for shutting off the flow of water from the upper strata. The electrode means described is lowered into the wall by means of the cable to which it is attached and when it reaches the point at which the conductivity measurement is to be made readings are taken by means of a Wheatstone bridge, showing the resistance of the liquid interposed between the electrodes 1 and 2. For this purpose electromotive force or potential difference is supplied to the conductors leading to the electrodes 1 and 2 by the supply circuit connections shown, and the resistance is determined by balancing the resistance in that arm of the Wheatstone bridge including the electrode means against the adjustable resistances in the other arms of the bridge in well known manner until the null point indicator shows a balance. It will be understood however that any equivalent of the Wheatstone bridge or other electrical measuring means may be utilized for determining the resistance of the liquid between electrodes 1 and 2. In the operation of the apparatus above described in connection with oil wells where the purpose is to determine the salinity of the water in certain portions of the well bore it will be understood that more or less oil will be present with the water and in such cases it has been found difficult to make electrical measurements by means of electrodes exposed to the liquid, for the reason that contact of the oily material with a metallic electrode interferes with the operation of the apparatus by interposing a variable and indeterminate resistance and preventing effective contact of the water with the electrode surfaces due to adherence of oil to such surfaces, thus, making the conductivity reading unsatisfactory or even impossible. By providing the electrodes with an oil repellent and water-attractive coating as above described I am enabled to ensure effective operation of the electrodes in contact with the liquid even when such liquid contains considerable oily material.

My invention may also be applied to conductivity measurements, in any body of liquid containing saline solutions, or other electrolytes, and also including oily material which is liable to interfere with the effective contact of the testing electrodes with the liquid to be tested.

While I have referred particularly to electrodes made of nickel, gold, platinum, etc., the electrodes can be made of any electrical conductor of the first class. In some cases (e. g. as when the water present contains much sulfur) nickel might be unsuitable. In that case I could employ gold, hard carbon, graphite, or heavily gold plated base metal for the electrodes, coated with agar or equivalent as above described.

I have found that the casing 3, which surrounds the electrodes, can be round or rectangular (say square) or other shape in cross section, and this can be conveniently formed of hard insoluble infusible condensation products of phenol and formaldehyde. A suitable iron casing can be provided on this, to prevent wear as this is raised and lowered rapidly through the casing.

What I claim is:

1. Means for conductivity measurements in aqueous liquids containing oily material comprising a support, electrodes carried thereby, and electrical connections to said electrodes, said electrodes being of conductive material coated with oil repellent material.

2. An electrode for the purpose set forth having a coating of gelatinous oil repellent material.

3. A non-noble metal electrode for the purpose set forth having a coating of gelatinous oil-repellent material.

4. An electrode for the purpose set forth consisting of a conductor covered with fabric and with gelatinous oil-repellent material.

5. An electrode for the purpose set forth consisting of a conductor provided with a coating whose surface is adapted to be readily wetted by water but not by oil.

6. Electrodes suitable for use in testing electrical resistance of saline water in oil wells, having a base of nickel coated with agar jelly, such jelly being in a wet state, such electrode being immediately wetted by aqueous liquids when immersed therein, but not being wetted by mineral oil when immersed therein.

7. Electrodes suitable for use in use in aqueous liquid in contact with oily material, having a non-noble metal body and a coating over substantially their entire surface, which coating is of a jelly-like character, readily wettable by water and aqueous solutions but not readily wettable by oil.

8. An electrode adapted for use in connection with aqueous liquid carrying oil, which comprises an electrode having a base composed of an electrically conducting material, the surfaces thereof being readily wettable by aqueous liquids but not by oil.

In testimony whereof I have hereunto subscribed my name this 13th day of December, 1924.

FREDERICK W. HUBER.